(No Model.)

T. McCLELLAND.
REVOLVING HARROW.

No. 290,781. Patented Dec. 25, 1883.

WITNESSES:

INVENTOR:
T. McClelland
BY Munn & Co
ATTORNEYS.

UNITED STATES PATENT OFFICE.

THOMAS McCLELLAND, OF MATTOON, ILLINOIS.

REVOLVING HARROW.

SPECIFICATION forming part of Letters Patent No. 290,781, dated December 25, 1883.

Application filed October 9, 1883. (No model.)

*To all whom it may concern:*

Be it known that I, THOMAS MCCLELLAND, of Mattoon, in the county of Coles and State of Illinois, have invented a new and useful Improvement in Revolving Harrows, of which the following is a full, clear, and exact description.

Reference is to be had to the accompanying drawings, forming a part of this specification, in which similar letters of reference indicate corresponding parts in both the figures.

Figure 1:
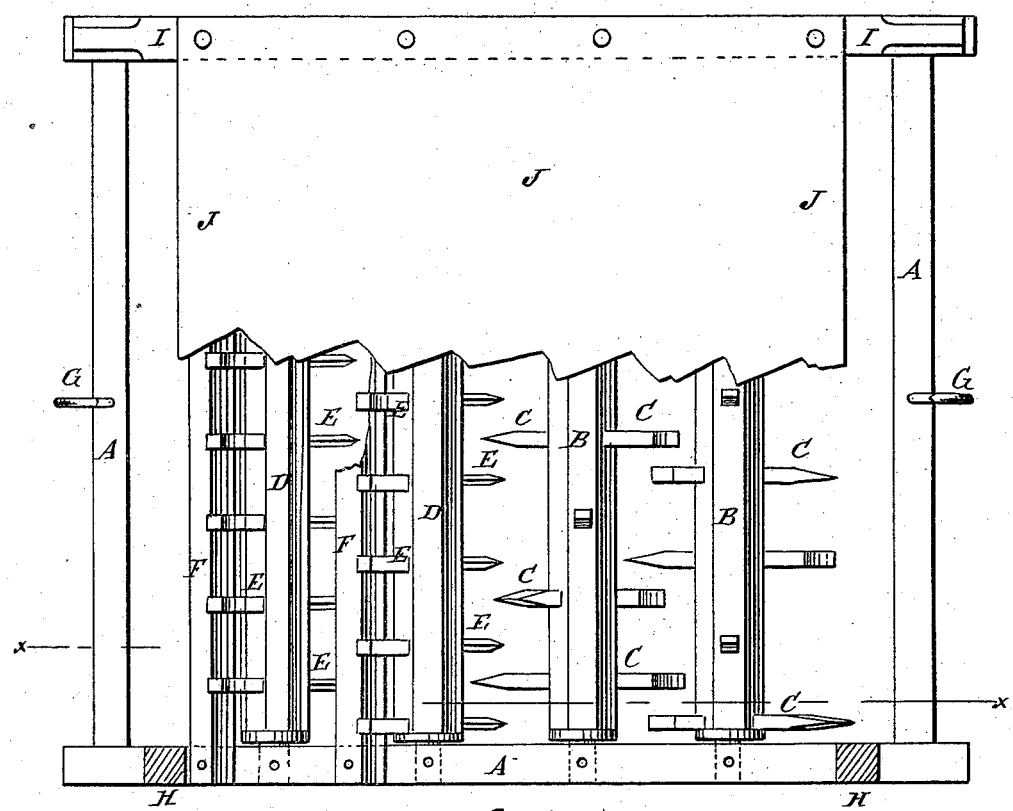
Figure 2:
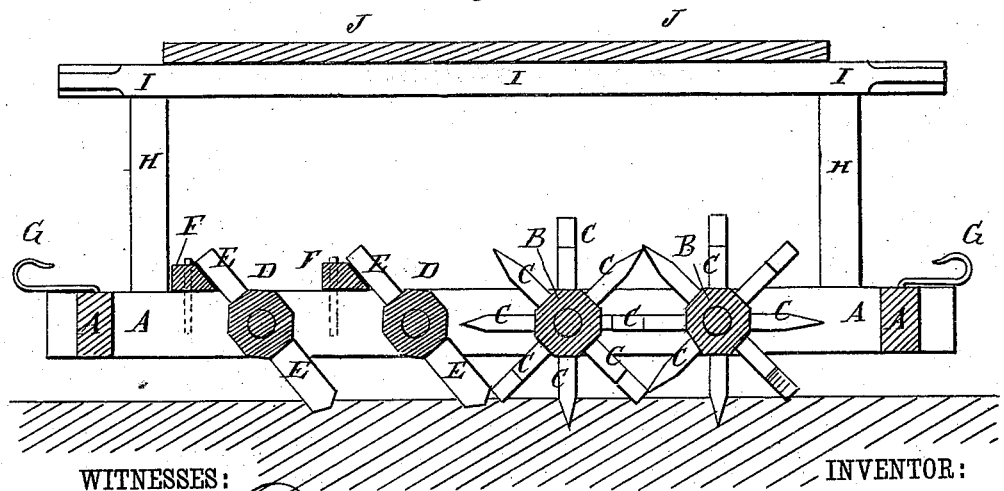

Figure 1 is a plan view of my improvement, parts being broken away. Fig. 2 is a sectional side elevation of the same taken through the line *x x*, Fig. 1.

The object of this invention is to promote thoroughness in the operation of harrowing, and facilitate the clearing of the harrow-teeth from rubbish.

The invention consists in a revolving harrow constructed with a frame carrying rollers provided with teeth for loosening the soil, and rollers provided with knives for cutting in pieces sods, clods, and lumps, cross-bars to hold the knives to their work, and a platform and its supporting posts and bars to carry the driver and a depth-regulating weight, as will be herein shown and described.

A represents the frame of the harrow, which is formed of two side bars connected at or near their ends by two cross-bars.

In bearings in the side bars of the frame A revolve the journals of four octagonal rollers, the two rear ones, B, of which are provided with teeth C passing through the said rollers and projecting upon the opposite sides. The teeth C are arranged in spiral form, and may be varied by inserting the first tooth in the center of the one roller and running the spirals in the same direction toward each end, forming a right and left spiral. In the other roller the spiral may be run in the same direction from one end of the roller to the other, the teeth of the two rollers being so arranged that the teeth of the one roller will pass between the teeth of the other roller as the said rollers are revolved. With this construction the rollers B will be revolved by the contact of the teeth C with the ground, and the teeth of the one roller will clear the teeth of the other roller from straw, grass, weeds, and other collected rubbish. The other two rollers, D, are provided with knives E, arranged in rows, and the shanks of which pass through the said rollers, and the said knives are secured in place by nuts screwed upon their shanks by wedge-keys, or by other suitable means. The shanks of the knives E project so as to strike against cross-bars F, attached to the side bars of the frame A in such positions as to hold the knives E at the desired inclination. The lower or working parts of the knives E are made with edges upon their front and rear sides, so that the said knives can be kept sharp by drawing the harrow for a while with one end forward, and then with the other end forward. The rollers D and knives E are designed for use in cutting in pieces sods, clods, and lumps. When the soil is free from lumps, sods, and clods, the cross-bars F can be detached and the knife-rollers D E replaced by toothed rollers B C.

To the front and rear cross-bars of the frame A are attached hooks G or chains for the convenient attachment of the draft.

To the front and rear parts of each side bar of the frame A are attached the lower ends of short posts H, to the upper ends of which are attached side bars, I.

To the side bars, I, is attached a platform, J, for the driver to stand or sit upon, and which can also be used to receive a weight, to cause the harrow to work deeper in the soil. The platform J can also be used as a receptacle for loose stones, stumps, and roots found in the soil, and which it is desirable to carry to the side of the field.

The rollers B are journaled to the side bars of the frame A in such positions that the lower sides of the said rollers may be flush with the lower sides of the said side bars, so that the said rollers, when the harrow is at work, will roll upon the surface of the soil, and thus level and smooth the said surface.

Having thus described my invention, I claim as new and desire to secure by Letters Patent—

A revolving harrow constructed substantially as herein shown and described, and consisting of the frame A, the rollers B, provided with teeth C, the rollers D, provided with knives E, the cross-bars F, and the posts and bars H I, and the platform J, as set forth.

THOMAS McCLELLAND.

Witnesses:
GEORGE FLORE,
AMBROSE S. FLINN.